Figure 1:
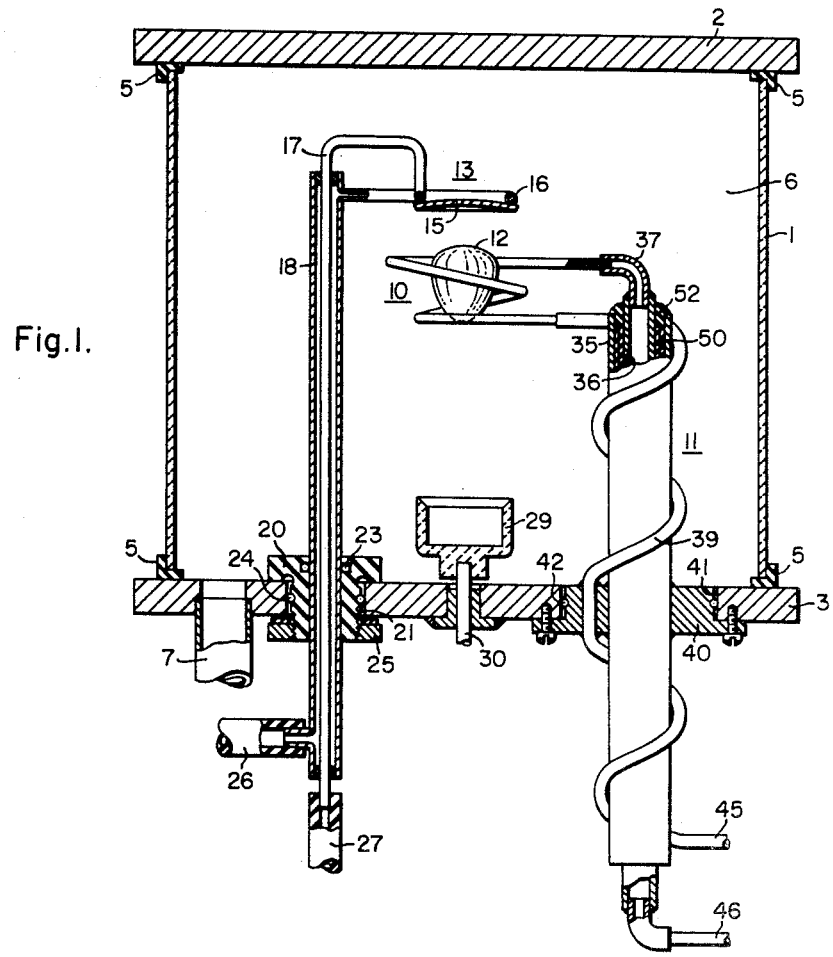

Oct. 18, 1960     G. COMENETZ     2,957,064

STABILIZING OF LEVITATION MELTING

Filed Sept. 30, 1958

WITNESSES

INVENTOR
George Comenetz
BY
ATTORNEY

United States Patent Office 2,957,064
Patented Oct. 18, 1960

2,957,064

STABILIZING OF LEVITATION MELTING

George Comenetz, Forest Hills, Pa., assignor to Westinghouse Electric Corporation, East Pittsburgh, Pa., a corporation of Pennsylvania Filed Sept. 30, 1958, Ser. No. 764,308

6 Claims. (Cl. 219—10.43)

This invention relates to heating and/or melting of electrically conductive materials while levitated by an alternating magnetic field in air, vacuum or inert gas, as an improvement over that described and claimed in Wroughton et al. Patent 2,686,864, issued August 17, 1954, and assigned to the assignee of the present application.

The apparatus of the above-mentioned Wroughton et al. patent employs a lower coil adapted to be suitably energized for effecting leviation and heating of a charge, and an upper coil adapted to be energized for opposing the field of the lower coil to create a region of weakened field between the two coils which will be sought by the levitated charge and thus tend to stabilize the floating of such charge in behalf of preventing its touching or jumping free of influence of the lower coil. A considerable number of metals and alloys have been levitated in an inert atmosphere and melted electromagnetically by use of such apparatus energized, for example, at about 450 kc. per second and 600 volts. However, attempts to employ such apparatus as so energized for melting of these metals in the presence of a vacuum often resulted in failure due to excessive arcing ensuing within the vacuum chamber between components therein, such for example, as from a point on the lower coil, via the floating charge or vapor therefrom, to a point on the upper or stabilizing coil. A reduction in the number of turns in the lower or levitating coil, together with a reduction in operating voltage of the two coils resulted in successful vacuum melting of several metal alloys previously unsuccessful, such as certain alloys of niobium (niobium tungsten, niobium hafnium, and niobium rhenium), however, electrical breakdown in the form of excessive arcing was still experienced in connection with attempts to handle other alloys such as niobium yttrium, for example.

In view of the foregoing remarks, it becomes a prime object of the present invention to provide electromagnetic levitation melting apparatus which may be employed for melting in air, inert gas, or a vacuum, metals including those previously found difficult or impossible to handle in a vacuum.

In accord with the above object, the present invention embodies improved stabilizing means in the form of a metal disc, ring, rod, cylinder or the like, herein termed a "dock" isolated electrically from the levitation coils in lieu of the upper or stabilizing coil of the previous apparatus. The eddy currents induced in the dock weaken or cancel the field near it as produced by the levitation coil, and the charge tends to float to a stabilized position beneath the dock, or partly within, if, for example, such dock is in the form of a ring or cylinder suitably positioned with respect to the levitation coil.

The dock is preferably made of a good electrical and heat conductive material such as copper, silver, or silverplated copper electrically insulated from the levitation and heating coil means. It may be water-cooled, although this is not essential for many levitation melting runs of short duration, and may even be cooled to very low temperatures to take advantage of the increase in conductivity of the dock which is attainable in that manner. Since the dock of the present invention is not joined electrically to the levitation and heating coil, arcing between the floating charge and the dock is not encouraged, and even if the floating charge should sway sufficiently to come into contact with the dock, no untoward effect other than the freezing out of the contacting portion of the charge will result.

In addition, by employment of the dock of the present invention in lieu of the stabilizing coil of the previous apparatus, the equipment is simplified in regards to fabrication of the levitation-heating coil, and an arrangement is provided which enables lower and less arc-inducing voltages to be employed; the dock lessens the inductance of the levitation-heating coil means. Furthermore, in the instant invention, the stabilizing element or dock is adjustably mounted proximity-wise with respect to the levitation-heating coil means to enable an optimum effective position to be found for such dock, by trial.

The present invention provides further improvement in the provision of a novel single low-loss coaxial line, extending into the evacuation chamber substantially to the site of the levitation coil, for conducting energizing current and cooling fluid to and from the levitation-heating coil means. By virtue of such improvement, difference in potential between the levitation-heating coil and various portions of the conducting means within the evacuation chamber is substantially reduced and arcing between these components in the presence of volatilized components of the charge within such chamber is thus discouraged. The apparatus previously referred to herein and employing separate leads for respective supply and return of coolant and energizing current to and from the coil means within the evacuation chamber included considerable portions of high impedance which inherently caused considerable drop in electrical potential and created differences in potential between such coil means and portions of the leads within the evacuation chamber. Such potential differences tended to encourage arcing between the components within the evacuation chamber in the presence of volatilized charge components.

Figure 2:
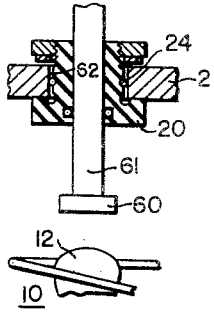

Other objects and advantages of the invention will become apparent from the following detailed description thereof taken in connection with the accompanying drawing, in which:

Figure 1 is a vertical sectional view of the levitation heating and/or melting apparatus embodying the invention; and Fig. 2 is a fragmental vertical view, partly in outline and partly in section, showing an alternate form of stabilizing element as may be employed in the apparatus of Fig. 1.

Referring to Fig. 1, the levitation heating apparatus embodying the invention comprises enclosure means including at least portions of transparent or semi-transparent material, to enable observation of the levitation heating operations performed within, and suitably sealed to permit the holding of sub-atmospheric pressures therein. Preferably, such enclosure may take the form as shown in Fig. 1, comprising a transparent cylinder 1 of heat-resisting material such as glass manufactured under the name "Pyrex," interposed between preferably metallic parallel cover and base members 2 and 3, respectively, to which its opposite ends are sealed gas or vacuumtight by means such as a neoprene rubber gasket 5 of L-shaped cross section, to define a chamber 6 capable of containing gas, such as argon, nitrogen, helium, etc., or of being evacuated in holding sub-atmospheric pressures. A pipe or conduit 7, preferably associated with bottom member 3, provides for evacuation and passage of inert gas to and from the chamber 6.

In the present embodiment, the levitation and heating coil means 10 is supported for disposition at a fixed location within the chamber 6 through the medium of a novel conductor assemblage 11 extending upwardly through the bottom member 3 via which energizing current and coolant, such as water, is supplied to coil means 10.

In behalf of enabling operation of the levitation and heating coil means 10 at less than 150 volts at the higher frequencies in the neighborhood of 450 kc., for example, to thereby discourage arcing during vacuum melting, preferably the coil means 10 will be made of such as ⅜₆ inch O.D. copper tubing and having only two vertically spaced-apart turns, as shown in Fig. 1; the lower turn having an inside diameter of such as ½ inch, for example, and the upper turn having an inside diameter of ¹⁵⁄₁₆ inch and being separated from the lower turn by ¹⁄₁₆ inch. The coil means in this form has successfully operated at currents as great as 600 amperes as furnished from a 10 kw., 450 kc. generator associated with a bank of capacitors for extended current range. Where higher voltages may be permissible, as in levitation melting in an inert atmosphere, for example, it may be preferable for coil means 10 to possess a greater number of turns, and the shape of such coil means may be altered without departing from the spirit and scope of the invention.

In accord with a feature of the invention as set forth hereinbefore, the stabilizing means in the form of a dock 13 for stabilizing the floating position of the charge 12 levitated by energization of coil means 10, may take the form as shown in Fig. 1 consisting of a water-cooled inverted saucer member 15, ¹⁄₁₆ inch thick, for example, and such as ¹⁵⁄₁₆ inch in diameter, to the upper surface of which is soldered a single-turn cooling coil 16 formed of ⅜₆ O.D. copper tubing, for example, connected with a pair of coaxially-arranged tubular members 17 and 18 for support and circulation of coolant. The dock 13 as supported by tubular members 17, 18 via coil 16 will occupy an adjacent position above and substantially coaxial with the coil means 10 to reduce the strength of the electromagnetic field produced by the coil means 10 in a region substantially centrally located radially thereof, thereby creating a central region to which the floating charge 12 is urged, in accord with an operating feature of the invention.

The support means, in the form of tubular members 17, 18 for the dock 13 is insulated electrically from the enclosure means by a feed-through member 20 of resilient, heat-resistant, electrical insulating material which is disposed in an accommodating opening 21 in the bottom member 3 and through which such tubular members 17 and 18 extend. By virtue of such electrical insulation of the dock 13 from the coil means 10, it will be apparent that such dock will tend to be electrically neutral, and even in the event that the charge should bridge across from a point and the coil means 10 to a point on the dock 13, it would do so without arcing and no untoward effect other than a possible freezing out or solidifying of a respective portion of the charge 12 will result.

To enable adjustment and position of the dock 13 proximity-wise of the coil means 10 to vary the cancellation effect of such dock on the electromagnetic field produced by the coil means, hence enable effective positioning of same in presence of differing charge sizes, for example, the outer tubular member 18 may be slidably disposed within the feed-through member 20 and sealed by an O-ring 23, as an exemplification of a manner in which such adjustment may be arrived at in simplification.

To enable adjustment in position of the dock 13 radialwise of the coil means 10 to afford flexibility in control of the piston of the charge 12, for example, the feed-through member 20 is adapted to be tilted or wobbled within the opening 21, in the presence of an O-ring 24 which seals against leakage past such feed-through member. Retention of the feed-through member 20 within opening 21 may be obtained by provision of such a washer and nut arrangement 25 in screw-threaded attachment to an end of the member 20 as shown in Fig. 1.

Radialwise movement of the dock 13 also enables same to be swung away from its position above the coil means 10 to permit the charge to be admitted thereto from above, by means such as disclosed in the aforementioned Wroughton et al. Patent 2,686,864. Top loading of the coil means 10, when in tapered form as shown in Fig. 1 herein, permits the handling of charges of greater size than can be passed through the bottom of such coil means by employment of means 29, 30.

To provide for circulation of a cooling medium through the tubular members 17 and 18 while preserving their electrical isolation from the coil means 10, the lowermost ends of such tubular members are adapted to be connected to respective conduits 26, 27 of rubber or plastic tubing for conveying such cooling medium thereto.

Means for placing the charge 12 under influence of the coil means 10 and for collecting such charge following its melting, for example, may take the form of a cup 29 which is adapted to be raised and lowered through the medium of a rod 30 in slidably guided sealed cooperation with the bottom member 3. Such as solenoid means (not shown) may be operatively associated with the rod 28 for actuation thereof.

The conductor assemblage 11 comprises coaxially arranged tubing members 35 and 36 which are electrically and mechanically connected to opposite ends of the coil means 10. The upper end of the coil means 10 is joined to the uppermost end of the tubular member 36 through suitable fitting means 37 to provide for electrical connection, mechanical support and fluid-tight connection between these two members, while the lowermost end of the coil means 10 is joined to a tubing member 39 wound around and soldered to the outer surface of tubular member 35. Conductor assemblage 11 extends downwardly through a metallic feed-through member 40 disposed in an opening 41 in the bottom member 3, the outer surface of the tubing member 39 and tubular member 35 being soldered to such feed-through member 40 to provide a fluid-tight connection therebetween. An O-ring 42 provides a fluid-tight connection between the feed-through member 40 and the inner wall of opening 41 of bottom member 3. The lowermost ends 45 and 46 of tubing member 39 and of tubular member 36 are adapted to be connected to a source of high frequency alternating current energy (not shown) as well as to a source of cooling medium such as water (not shown) for energization and cooling of coil means 10. Encirclement of the outer tubular member 35 by tubing member 39 soldered thereto, further provides for cooling of the conductor assemblage 11.

High frequency electrical current supplied to the coil means 10 by the conductor assemblage 11 at 45 and 46 will travel along the inner cylindrical surface of outer tubular member 35 and the outer cylindrical surface of inner tubular member 36, due to the high frequency skin and proximity effect at such as 450 kc. To assure that such path will be of relatively low impedance, as in accord with a desirable feature of the invention, the size of tubular members 35 and 36 are relatively large as compared to the size of the tubing employed in coil means 10, it being satisfactory that the size of tubular member 35 be in the order of ¾ inch O.D. and inner tubular member 36 be in the order of ½ inch O.D. where such as ⅜₆ inch O.D. copper tubing is employed in coil means 10 and where these members are of highly heat and electrical conductive material such as copper.

To facilitate fabrication of the conductor assemblage 11, mechanical and electrical separation between the inner tubular member 36 and the outer tubular member 35 may be afforded by first wrapping such inner tubular member with a glass-silicone tape 50 such as manufactured by Mystic Adhesive Products Company, under the trade name "Mystik Tape" which is capable of withstanding temperatures up to 550° F. and is thus capable of withstanding any heat which may be created in the subsequent process of forming and soldering the tubing member 39 to the outer surface of tubular member 35, as well as withstanding heat which may be created by operation of coil means 10. A pressure-tight seal between tubular members 35 and 36 is obtained by sealing at their uppermost ends with a suitable wax 52 such as a wax material supplied by James G. Biddle Company, Philadelphia, under the trade name "Apiezon Hard Wax W."

As an alternate construction for the dock 13, same may take the form in which it is shown in Fig. 2, for example, of a solid disc of highly heat and electrically conductive material such as a copper disc 60 attached to a support rod 61 capable of supporting such dock and of conducting heat therefrom without employment of cooling coils. As a minor variant of the invention, the feed-through member 20 through which such rod 61 will extend may be disposed within a suitable opening 62 and cover member 2, rather than bottom member 3. It will be appreciated that in heating runs of relatively short duration, the dock 13 in the form of copper disc 60 will function in substantially the same manner as the inverted cup 15 of Fig. 1 to cancel the portion of the electromagnetic field created by the coil means 10 above which same is disposed, and that such disc 60 will be protected against damage due to excessive heat by virtue of conduction of heat therefrom to the support rod 61. Radialwise and proximity-wise adjustment of disc member 60 may be afforded by proper design of the respective feed-through member 20 and by virtue of sliding movement of support member 61 within such feed-through member. Where such feed-through member must be capable of withstanding relatively high temperatures, in the order of 300° F., for example, such feed-through member may be made of a resilient, plastic material capable of withstanding this temperature, such as tetrafluoroethylene resin. Other minor variations of the invention might include making the dock 13 in other forms such as the end of a continuous rod of copper, or other suitable material; a ring of hollow or solid construction, etc.; any or all of which may if desired be associated with circulation of cooling medium, in accord with the present teachings.

Although certain specific embodiments of the present invention have been shown and described, it should be apparent to those skilled in the art that other modifications thereof may be made without departing from the spirit and scope of such invention.

I claim as my invention:

1. Apparatus for levitating, heating and melting electrically conductive materials, comprising coil means having a substantially vertical axis adapted to be energized by alternating current to generate a magnetic field for levitation and heating of a conductive charge, an electrically conductive stabilizing member disposed above said coil means substantially in alignment with said axis to reduce by eddy current opposition a central region of said magnetic field which will be sought by a charge levitated by such field, and means for cooling said stabilizing member independently of its ambient surroundings.

2. Apparatus for levitating, heating and melting electrically conductive materials, comprising coil means having a substantially vertical axis adapted to be energized by alternating current to generate a magnetic field for levitation and heating of a conductive charge, an electrically conductive dock member to reduce by eddy current opposition a region of said magnetic field which will be sought by a charge levitated by such field, and means for supporting said dock member centrally above while insulating same electrically from said coil means and means for conveying a cooling liquid to said dock member.

3. Apparatus for levitating, heating and melting electrically conductive materials, comprising coil means having a substantially vertical axis adapted to be energized by alternating current to generate a magnetic field for levitation and heating of a conductive charge, an electrically conductive dock member to reduce by eddy current opposition a region of said magnetic field which will be sought by a charge levitated by such field, and adjustable means for supporting said dock member centrally above and insulating same electrically from said coil means while permitting vertical and radial adjustment in position of said dock member relative to said coil means.

4. Apparatus for levitating, heating and melting electrically conductive materials, comprising coil means having a substantially vertical axis adapted to be energized by alternating current to generate a magnetic field for levitation and heating of a conductive charge, an electrically-conductive liquid-cooled dock member in form of an inverted saucer to reduce by eddy current opposition a region of said magnetic field which will be sought by a charge levitated by such field, and means for supporting said dock member centrally above and insulating same electrically from said coil means.

5. Apparatus for levitating, heating and melting electrically conductive materials, comprising coil means having a substantially vertical axis adapted to be energized by alternating current to generate a magnetic field for levitation and heating of a conductive charge, an electrically-conductive dock member to reduce by eddy current opposition a region of said magnetic field which will be sought by a charge levitated by such field, tubular means of electrically conductive material attached to said dock member for support thereof and circulation of coolant thereto and therefrom, and means supporting said tubular means for disposition of said dock member centrally above said coil means while insulating electrically therebetween.

6. In high frequency heating apparatus, in combination with coil means formed of electrically conductive hollow tubing for generating a magnetic field for heating of an electrically conductive charge, conductor means comprising coaxially-arranged inner and outer electrically-conductive radially-spaced-apart tubular members of relatively great diametral dimension as compared to said hollow tubing of which said coil means is formed, means connecting an adjacent end of the innermost one of said tubular members to one end of said coil means for conveying coolant and alternating current electrical energy therebetween, an electrically-conductive serpentine tubing member wound around in soldered juncture with and extending longitudinally of the outer one of said tubular members, and means connecting an adjacent end of said serpentine tubular member to the other end of said coil means for conveying coolant and alternating current therebetween, the opposite end of the innermost tubular member and of the serpentine tubular member being adapted for connection to respective means for conveying coolant and alternating current electrical energy therebetween.

References Cited in the file of this patent
UNITED STATES PATENTS

| | | |
|---|---|---|
| 2,377,175 | Peer | May 29, 1945 |
| 2,566,221 | Lovell | Aug. 28, 1951 |
| 2,686,864 | Wroughton et al. | Aug. 17, 1954 |
| 2,691,306 | Beams et al. | Oct. 12, 1954 |
| 2,844,801 | Sabaroff | July 22, 1958 |
| 2,898,429 | Emeis et al. | Aug. 4, 1959 |
| 2,904,663 | Emeis et al. | Sept. 15, 1959 |